United States Patent Office 2,948,127
Patented Aug. 9, 1960

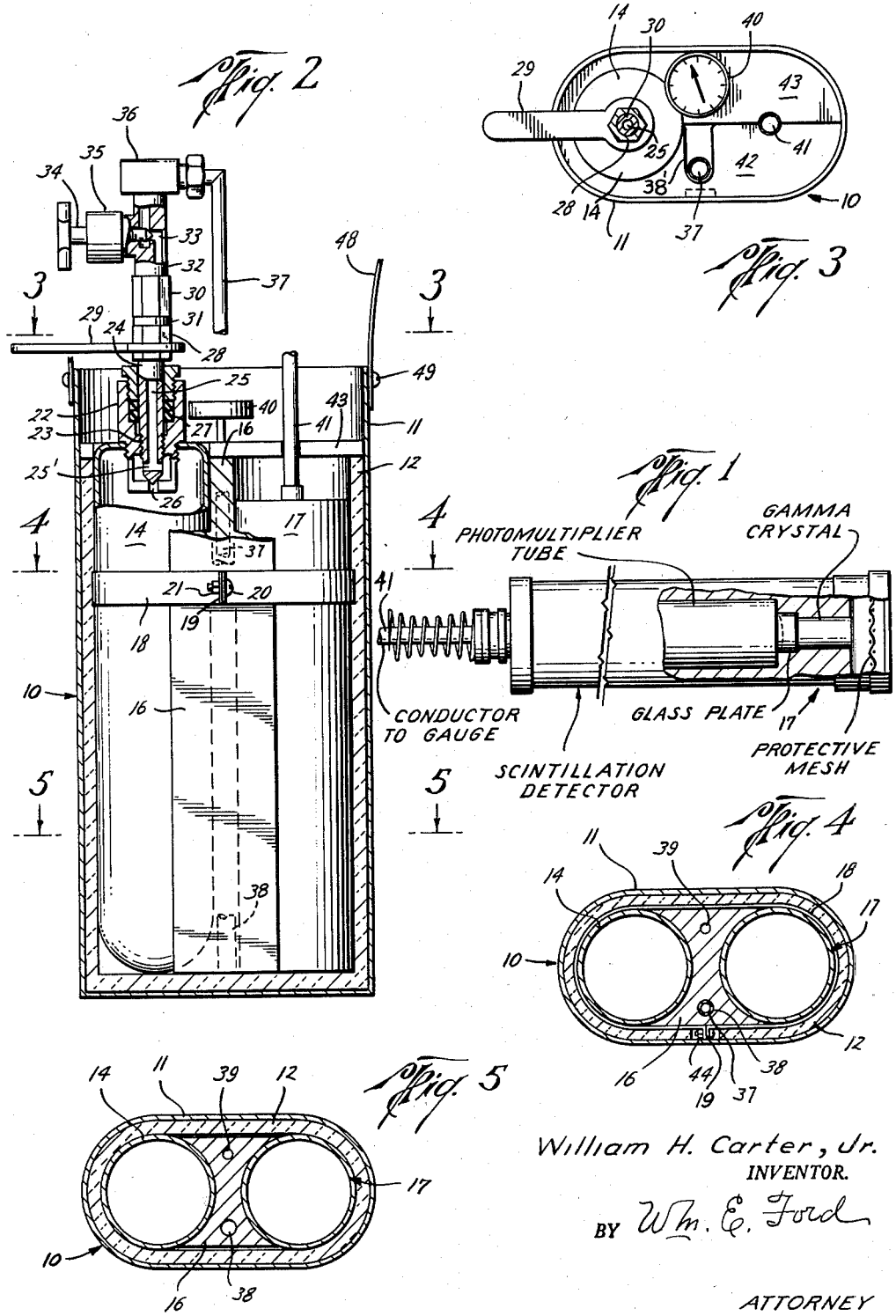

2,948,127

PORTABLE REFRIGERATION SYSTEM FOR REFRIGERATING SCINTILLATION DETECTORS AND THE LIKE

William H. Carter, Jr., % Electro-Mechanical Development Co., 2337 Bissonnet, Houston, Tex.

Filed July 30, 1956, Ser. No. 600,817

5 Claims. (Cl. 62—384)

This invention relates to a portable refrigeration system and method of refrigerating scintillation detectors and the like, whereby an expendable refrigerant is carried with the detector to be refrigerated and dissipated in controlled degree during the use of the detector in the course of surface and sub-surface operations.

The necessity of refrigerating a device such as a scintillation detector employed in detecting such indications as those indicating uranium deposits and sub-surface indications of oil results from the inherent noise characteristics of any vacuum tube, especially a photomultiplier tube, as at times the noise impulse rate exceeds the signal impulse rate, it being well known that in such usages the noise ratio increases almost with the square of the temperature.

As shown in Fig. 1 of the drawings such a scintillation detector includes a gamma crystal of a substance such as anthracine, potassium iodide, or sodium iodide activated with thalium as an impurity or catalyst. Gamma rays entering the crystal as emanating from some such source as an oil or uranium deposit have the gamma energy thereof converted by the crystal into photons or tiny flashes of light. In order to detect these tiny flashes and convert them into electrical pulses the crystal is coupled optically to the end of a photomultiplier tube containing a number of amplifying stages and by means of conventional circuits the light flashes thus amplified are converted into amplified electrical impulses reflected in conventional gauge or meter readings. A conventional scintillation detector is shown on pages 6 and 7 of the catalogue entitled, "Operating and Maintenance Instructions P-20 a Scintillation Detector" of Tracerlab, Inc., 130 High Street, Boston 10, Massachusetts, and the electrical diagram thereof is shown in page 15 thereof, this type of well-known scintillation detector being fully described in such catalogue.

The invention herein consequently has as its primary object the provision of a portable, refrigerated scintillation device whereby such device may be carried without difficulty into close quarters and rugged terrain or jungle and maintained refrigerated over periods of use so that any photons or flashes induced in the gamma ray crystal of the scintillation device may be translated for detection without interference from noise impulses.

It is also an object of this invention to provide a portable scintillation device of this class in which the refrigerant employed is expendable, as "Dry Ice" or carbon dioxide in initially solid state, whereby the weight and expense of conventional closed system refrigerating systems requiring motors, compressors, and the like, are eliminated.

It is another object of this invention to provide a portable refrigerated scintillation device of this class which is adapted to be lowered into well bores, and the like, for sub-surface exploration, in which case the device is equipped with means actuated from the top of the well or automatically operable to pay out the feeding of the expendable refrigerant.

Other and further objects will be apparent when the specification is considered in connection with the drawings in which:

Fig. 1 is a view, part in section, of a conventional scintillation device, the parts thereof being indicated diagrammatically;

Fig. 2 is an elevation part in section, of a portable refrigerated scintillation device as embodied by this invention;

Fig. 3 is a plan view, part in sectoin, taken along line 3—3 of Fig. 2;

Fig. 4 is a sectional plan view taken along line 4—4 of Fig. 2; and

Fig. 5 is a sectional plan view taken along line 5—5 of Fig. 2.

Referring in detail to the drawings, a portable, refrigerated scintillation device assembly 10 is shown in Fig. 2 as including a housing 11 of a thin light metal, as aluminum but of wall thickness to give rigidity thereto and firmly confine the parts within. Within the housing 11 there is provided a thick walled cup or insulative layer 12 within which are inserted the refrigerant cylinder 14 and the scintillation device 17, such being spaced apart by a light metallic block 16, as an aluminum block which is relieved on the opposite sides thereof to snugly receive therein the semi-peripheral surfaces of the refrigerant cylinder and the scintillation device 17, the block thereby acting as a spacer thereinbetween. For added security a metallic band 18 extends around the refrigerant cylinder 14, the aluminum block 16, and the scintillation device 17, and this band has a flange 19 on each end thereof, the flanges being drawn together by passing the screw 20 through holes in the flanges and threading it into the nut 21 to tighten the band 18 firmly about the elements about which it extends.

The refrigerant cylinder 14 has a top closure fitting 22 threadable thereinto after the cylinder has been filled with an expendable refrigerant, such as carbon dioxide or "Dry Ice" in solid state as reduced thereto at excessive pressures such as pressures of say 980 p.s.i. The fitting 22 is threaded internally at 23 to receive therein the threaded portion of a needle valve stem 24 which has fluid passages 25, 25' therein as shown and which seats on a valve seat provided by the fitting 22 to control the outlet port 26 therein which controls communication with the interior of the cylinder 14.

A stuffing box is provided in the upper end of the fitting 22 to receive packing 27, and to threadably receive the gland 28 which tightens the packing 27 around the valve stem 24. The top 28 of the needle valve stem 24 is of hexagonal cross-section to receive a suitable wrench 29 thereon and thereabove a fitting 30 is provided having an axial bore therethrough and having a reduced diameter, externally threaded lower portion and a larger upper part, also of hexagonal cross-section, so that the upper part shoulders upon a gasket 31, of a compressible material to force it tightly against the hexagonal part of the needle valve stem 24.

Above the fitting 30 a special T fitting 32 is provided having a flow passage 33 therethrough and a needle valve stem 34 provided to extend in the perpendicular leg of the T to seat upon a valve seat in said fitting to control fluid flow through the flow passage. A conventional thread-on type gland 35 is provided to compress packing within the top of the perpendicular leg and prevent leakage about the needle valve stem 24. Above the T 32 an adapter fitting 36 is provided to complete fluid communication between the flow passage through the T 32 and a tubing 37 which extends downwardly into a bore 38 in the aluminum block 16, such bore 38 being slightly larger in diameter than the tubing 37 and extending through the block 16.

A bore 39 is also provided in the block 16 as best shown in Figs. 4 and 5 to receive the bulb of a conventional gauge insert type of thermometer 40, such thermometer having a conventional graduated dial on the top of the bulb to record the temperature within the block 16.

The insulated electrical conductor 41 from the photomultiplier tube of the scintillation device extends upwardly therefrom and is carried to a suitable recording gauge not shown in Fig. 2. To complete the insulation of the assembly two slabs 42 and 43 of insulative material are provided and notched out to permit the top of the refrigerant cylinder to extend therethrough, and are also notched to let the thermometer bulb extend therethrough as well as the tubing 37 and the insulated conductors 41. Additionally the insulative cup 12 is notched at 44 to permit the connected flanges 19 of the band 18 to be inserted into the assembly.

The refrigerant, such as "Dry Ice" is processed for use by freezing pressurized carbon dioxide gas in successive steps until it is solidified at a temperature approximating —78.2 C. The solidified material is then crushed and inserted into the refrigerant cylinder 14 from which the closure fitting 22, with parts carried thereby, has been removed. The fitting is then replaced, together with such parts.

Within the cylinder the "Dry Ice" subject to heat returns to gaseous state and pressure as high as 3000 p.s.i. may be attained. In transition from solid to gaseous state the "Dry Ice" draws much heat from the surrounding aluminum block 16 which in turn acts as a conductor in drawing heat thereinto from the scintillation detector 17. Thus the noise impulse rate of the photomultiplier tube is diminished in degree so as not to interfere with the signal impulse rate of the photon flashes and these are transmitted from the gamma crystal by way of the photomultiplier tube without interference to register electrically on a suitable conventional gauge.

To open the outlet port 26 the wrench 29 is turned to rotate the needle valve stem 24 and move it upwardly in the threaded part 23 of the fitting 22. If it is desired to maintain the elevation of the horizontal axis of the adapter fitting 36 at its initial distance above the top of the fitting 22, a wrench may be placed on the hexagonal upper part of the fitting 30 and held still as the wrench 29 is turned, and in this case the amount the gasket 31 is compressed axially is the amount the needle valve stem 24 is raised from its seat at the top of the port 26.

A suitable strap 48 is fastened to the housing 11, as by the screws 49, and the device may be suspended as by placing the strap over the right shoulder of the explorer to extend diagonally across the body. In this case the device will rest upon his left thigh forward of the hip. Then the operator may hold a suitable gauge in his right hand, such gauge being electrically connected for actuation by the photomultiplier tube by means of the insulated conductor 41.

With his left hand the explorer may turn the handle of the control needle valve stem 34, as he walks with the gauge in his right hand and thus gas may expand from the cylinder 14 and escape by the passages 25' and the passage 25, and through a passage in the fitting 30 communicating therewith and with the passage 33 thereabove, and flow past the opened needle valve stem 35 to the passage through the adapter 36 and therefrom through the tubing 37 to the bore 38 to pass therefrom out the opening 38'' in the insulation slab 42. The expansion of the gas draws further heat from the detector 17 through the aluminum block 16 into the refrigerant cylinder 14; and thus the explorer may continually maintain the detector in refrigerated state as he walks in exploration by the manipulation of the handle of the control needle valve stem 34.

The use of a scintillation detector in surface exploration generally follows the patatern of walking along a substantially straight line from a surveyed point of origin and noting and/or recording distances from such origin at which the gauge indicates photon impulse translation in degree to indicate the presence of say uranium or oil below the surface of the earth. The explorer then walks from another surveyed point of origin along another substantially straight line intersecting the first straight line at say a preferred angle of 90° and along this line notes and/or records the distance from such origin at which the gauge indicates photon impulse translation in degree to support similar interpretation. He then walks along other lines parallel to the first two lines and spaced apart therefrom with design to intersect them at points where such activity had been noted or might be expected. In this manner the ground may be rapidly gridded in a manner to permit the plotting of the contour of an active surface area with much greater accuracy due to the clarity of photon occurrence indication than has heretofore been possible without refrigerated scintillation detectors.

The device of this invention may be employed in subsurface exploration as well in which case the needle valve stem 24 is opened and the needle valve stem 34 is also set open in degree to maintain refrigeration over the calculated period of sub-surface exploration. In this type of exploration the conductor 41 is of length equal to the projected depth of exploration and is payed out by conventional means, as from a reel, into the well to be explored, the end of the conductor being extended from the reel non-rotatably by a conventional arrangement and connected to a gauge also at the surface. In this type of exploration the device may be lowered by the conductor when it may be strong enough to support it, or optionally it may be lowered as by a reel payed out separate line. In either case indicated noticeable degree of activity is noted and/or recorded against the measured depths at which such indications emanate, and the device is then withdrawn to the top of the well.

As employment of the invention progresses the refrigerant may be renewed as it loses strength through absorption of heat and dissipation of gas. This may be done by removing the top 22 and filling with the frozen refrigerant, as "Dry Ice" or else the whole cylinder 14 and assembled parts may be exchanged for a similar assembly in which the cylinder is filled with fresh refrigerant, the removed assembly then being processed for replenishment of refrigerant and exchanged with its replacement.

The invention is not limited to the structure shown in the drawings or to the method steps of employment hereinabove set forth but other structures and successions of method steps are also included as such may fall within the broad spirit of the invention and within the broad scope of interpretation claimed and merited for the appended claims.

What is claimed is:

1. The combination of a refrigerant container, a device to be cooled as a scintillation detector, a thermal conductive block of rigidity therebetween positioning said container and said device in parallel spaced apart relation with axes in parallel, spaced apart, vertically coextensive diametral planes, an insulator surrounding said container, block, and device, and a housing surrounding said insulator, said container having a refrigerant therein in solidified state, a conduit from said container and an expansion valve in said conduit through which said refrigerant may expand when said valve is opened to escape from said conduit as a gas at substantially atmospheric pressure, heat thereby being drawn from said device and dissipated to the atmosphere along with the escape of said gas.

2. The combination of a refrigerant container, a device to be cooled as a scintillation detector, a thermal conductive block of rigidity therebetween positioning said container and said device in parallel spaced apart relation with axes in parallel, spaced apart, vertically co-extensive diametral planes, an insulator surrounding said container, block, and device, and a housing surrounding said insulator, said container having a refrigerant therein in solidified state, a conduit from said container and terminating adjacent to said detector, and an expansion valve in said conduit through which said refrigerant may expand when said valve is opened to escape from said conduit as a gas at substantially atmospheric pressure, the expansion of said gas drawing heat from said device into said block to be dissipated to the atmosphere along with the escape of said gas.

3. The combination of a refrigerant container, a device to be cooled as a scintillation detector, a thermal conductive block of rigidity therebetween positioning said container and said device in parallel spaced apart relation with axes in parallel, spaced apart, vertically co-extensive diametral planes, an insulator surrounding said container, block, and device, and a housing surrounding said insulator, said container having a refrigerant therein in solidified state, a conduit from said container and an expansion valve in said conduit, a bore in said block in which said conduit terminates adjacent said detector and providing escape space therearound through which said refrigerant may escape as expanded through said expansion valve, the expansion of said gas drawing heat from said device to be dissipated to the atmosphere along with the escape of said gas.

4. An assembly including a portable device as a scintillation device to be cooled, a refrigerant container, and a thermal conductive block of rigidity supporting said device and said container and extending between said device and said container and positioning said device and container in parallel spaced apart relation with axes in parallel, spaced apart, vertically co-extensive diametral planes, an insulator surrounding said device, block, and container, and a housing surrounding said insulator, said container having a refrigerant therein in solidified state, a conduit from said container, an escape valve in said conduit through which said refrigerant may expand in escaping from said container, a manually operable control valve in said conduit downstream of said escape valve to be manipulated to control the outward passage of the expanding refrigerant, and means to carry said assembly by an operator and adapted to position said control valve accessible for manual operation as the operator transports the assembly, the expansion of said gas drawing heat from said device to be dissipated to the atmosphere along with the escape of said refrigerant in gaseous form from said conduit.

5. Equipment for detecting sub-surface indications of substances such as oil, uranium, and the like including a portable scintillation device to be cooled, a refrigerant container, and a thermal conduction block of rigidity supporting said device and said container and extending between said device and said container and positioning said device and said container in parallel, spaced apart relation with axes in parallel, spaced apart, vertically co-extensive diametral planes, an insulator surrounding said device, block, and container, and a housing surrounding said insulator, said container having a refrigerant therein in solidified state, a conduit from said container, manual control means in said conduit accessible to an operator transporting said assembly to control the outward escape of said refrigerant as it expands through said control means into gaseous form to thereby draw heat from said device to be dissipated to the atmosphere, a meter also adapted to be transported by the operator and connected to said device detector to record electrically transmitted indications therefrom and visually discernible to the operator as he operates said control means while exploring over the surface above said sub-surface.

References Cited in the file of this patent
UNITED STATES PATENTS

| | | |
|---|---|---|
| 2,148,109 | Dana et al. | Feb. 21, 1939 |
| 2,433,554 | Herzog | Dec. 30, 1947 |
| 2,521,294 | Jackson | Sept. 5, 1950 |
| 2,686,268 | Martin et al. | Aug. 10, 1954 |
| 2,711,084 | Bergan | June 21, 1955 |
| 2,714,169 | Armistead | July 26, 1955 |